(12) United States Patent
Keyser et al.

(10) Patent No.: US 7,320,501 B2
(45) Date of Patent: Jan. 22, 2008

(54) REMOTE RELEASE ACTUATING SYSTEM FOR A SEAT ASSEMBLY

(75) Inventors: Mark R. Keyser, Lake Orion, MI (US); Michele R. Palomba, Romeo, MI (US)

(73) Assignee: Lear Corporation, Southfield, MI (US)

( * ) Notice: Subject to any disclaimer, the term of this patent is extended or adjusted under 35 U.S.C. 154(b) by 47 days.

(21) Appl. No.: 10/904,203

(22) Filed: Oct. 28, 2004

(65) Prior Publication Data

US 2006/0097560 A1    May 11, 2006

(51) Int. Cl.
*B60N 2/02* (2006.01)
*B60N 2/04* (2006.01)

(52) U.S. Cl. ................. 297/378.12; 296/65.09
(58) Field of Classification Search ........... 297/378.12; 296/65.09
See application file for complete search history.

(56) References Cited

U.S. PATENT DOCUMENTS

| | | | |
|---|---|---|---|
| 5,280,987 A | 1/1994 | Miller | |
| 5,364,152 A | 11/1994 | Mastrangelo et al. | |
| 5,634,686 A | 6/1997 | Okazaki | |
| 5,662,368 A | 9/1997 | Ito et al. | |
| 5,810,443 A | 9/1998 | Blanchard | |
| 5,871,255 A | 2/1999 | Harland et al. | |
| 5,961,183 A | 10/1999 | Smith et al. | |
| 6,000,742 A | 12/1999 | Schaefer et al. | |
| 6,065,804 A | 5/2000 | Tanaka et al. | |
| 6,250,704 B1 | 6/2001 | Garrido | |
| 6,345,867 B1 | 2/2002 | Hellrung et al. | |
| 6,478,358 B1 | 11/2002 | Okazaki et al. | |
| 2004/0195892 A1* | 10/2004 | Daniels | 297/378.1 |
| 2005/0253407 A1* | 11/2005 | Lutzka et al. | 296/65.09 X |

FOREIGN PATENT DOCUMENTS

| | | |
|---|---|---|
| DE | 19751469 A1 | 5/1999 |
| WO | WO 2004/060713 A1 | 7/2004 |

OTHER PUBLICATIONS

Combined Search and Examination Report under Sections 17 and 18(3), 5 pages.

* cited by examiner

Primary Examiner—Anthony D. Barfield
(74) Attorney, Agent, or Firm—Brooks Kushman P.C.

(57) ABSTRACT

A remote release actuating system 10 for a seat assembly 12 in a vehicle. Conventionally, the system includes a seatback 14 that is removable through an arcuate range. The seatback 14 is moveable between a design position (tilted upward and rearwardly in which it may support a passenger), and a full fold flat position. Seatback latches 24 secure the seatback 14 in the effective position. A seat cushion 32 supports the seatback 14. The seat cushion 32 has a rearward portion that cooperates with the seatback 14. The rearward portion also releasably engages floor latches 26. The seat cushion 32 has a forward portion that is pivotally attached to the vehicle floor. The seat cushion 32 and seatback 14 tumble forwardly when (a) the seat cushion 32 is disengaged from the floor latches 26; (b) the seatback 14 lies in the full forward flat position; and (c) the floor latches 26 are disengaged. The tumble forward position facilitates occupant ingress and egress in relation to the vehicle and provides access to luggage and storage areas. In operative communication with the seatback 14 and floor latches 26, there is provided a release system for releasing these latches 26 that is located remotely from the seatback 14 and the seat cushion 32. The invention also includes a method for remotely actuating the release system for the seat assembly.

19 Claims, 5 Drawing Sheets

REMOTE RELEASE ACTUATING SYSTEM FOR A SEAT ASSEMBLY

BACKGROUND OF THE INVENTION

1. Field of the Invention

The invention relates to an actuating release system for a seat assembly in which the assembly is actuated by a release that is located remotely from the seat assembly.

2. Background Art

Conventionally, seat assemblies include: (1) a seatback that is moveable over an arcuate range between a design position in which it may support a passenger's upper body (either upright or reclined) and a full fold flat position; (2) inboard and outboard seatback latches for releasably securing the seatback in the effective position; (3) inboard and outboard floor latches; and (4) a seat cushion that supports the seatback. The rearward portion of the seat cushion engages the floor latches. The seat cushion has a forward portion that is pivotally attached to the vehicle floor so that the seat cushion and seatback may tumble forwardly. This movement occurs when (1) the seatback latches are disengaged; (2) the seatback lies in the full forward flat position; and (3) when the floor latches are disengaged. The tumbled position facilitates occupant ingress and egress in relation to the vehicle and provides better access to luggage and storage spaces.

Among the patents identified in a search that was conducted before filing this application are the following U.S. references: U.S. Pat. Nos. 6,478,358; 6,345,867; 6,250,704; 6,065,804; 6,000,742; 5,961,183; 5,871,255; 5,810,443; 5,662,368; 5,634,686; 5,364,152; and 5,280,987.

SUMMARY OF THE INVENTION

Against this background, it would be desirable to make available to the vehicle user a seat fold and tumble feature which is released and activated remotely from the vehicle seat.

Further, it would be desirable if a system for releasing the seatback and floor latches were positioned on an overhead console or a C-pillar.

Additionally, it would be desirable if the remote release actuating system allowed manual operation during vehicle assembly and utilization when a vehicle battery is disconnected.

More specifically, it would be desirable to provide remote release by a switch or button that would fold the seat back and tumble the seat forwardly.

Still further, it would be desirable to allow the fold and tumble operations to be achieved through the combined deployment of a remote actuator, gas struts and springs.

To fulfill these and related objects, the present invention discloses a remote release actuating system for a seat assembly in a vehicle. Conventionally, the system includes a seatback system that is movable through a limited arcuate range about an axis positioned toward a lower portion of the seatback. The seatback is moveable between a design position (tilted upward and rearwardly in which it may support a passenger), and a full fold flat position.

A pair of seatback latches secures the seatback in the effective position. A seat cushion supports the seatback. The seat cushion has a rearward portion that cooperates with the seatback. The rearward portion also releasably engages the floor latches. The seat cushion has a forward portion that is pivotally attached to the vehicle floor. The seat cushion and seatback may tumble forwardly when (A) the seatback lies in the full forward flat position; and (B) both of the floor latches are disengaged. The tumble forward position facilitates occupant ingress and egress in relation to the vehicle and provides access to luggage and storage areas.

In operative communication with the seatback and floor latches, there is provided a system for releasing these latches that is located remotely from the seatback and the seat cushion.

BRIEF DESCRIPTION OF THE DRAWINGS

FIGS. 5 are block diagrams illustrating:

DETAILED DESCRIPTION OF THE PREFERRED EMBODIMENT(S)

Figure 1:
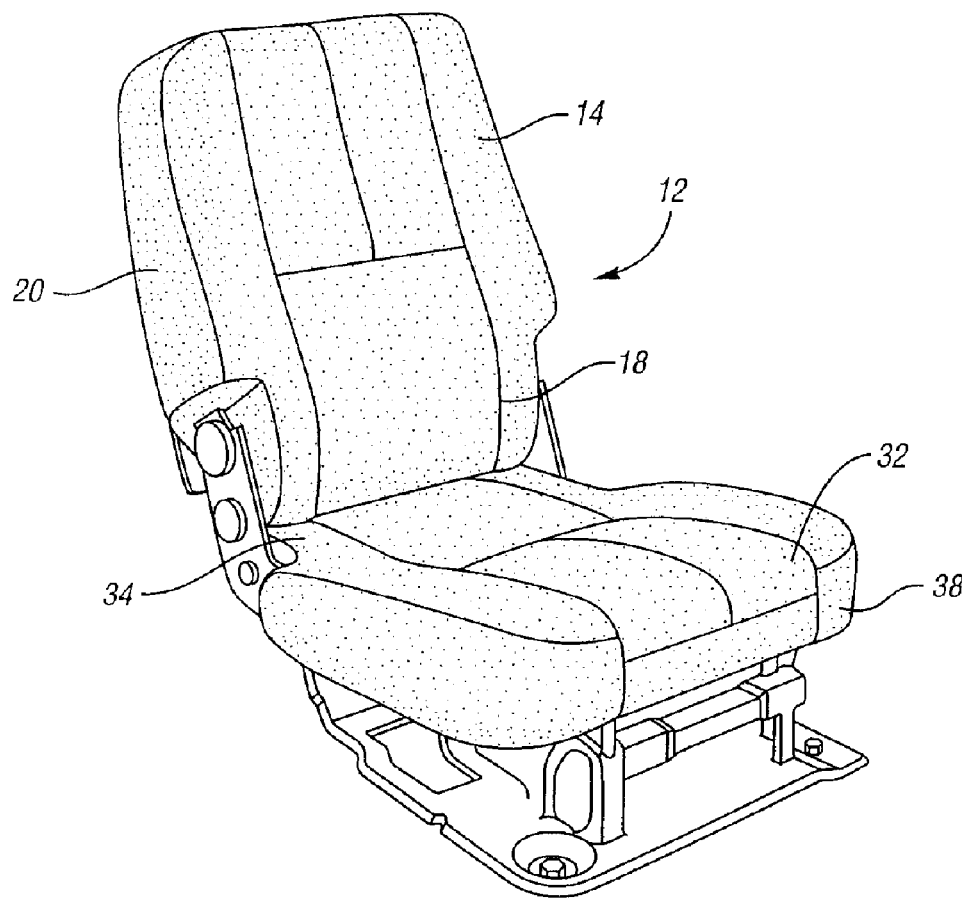
FIG. 1 is a quartering perspective view of a seat assembly illustrated as a seatback and seat cushion oriented in a position that is effective to support a vehicle occupant.
Figure 2:
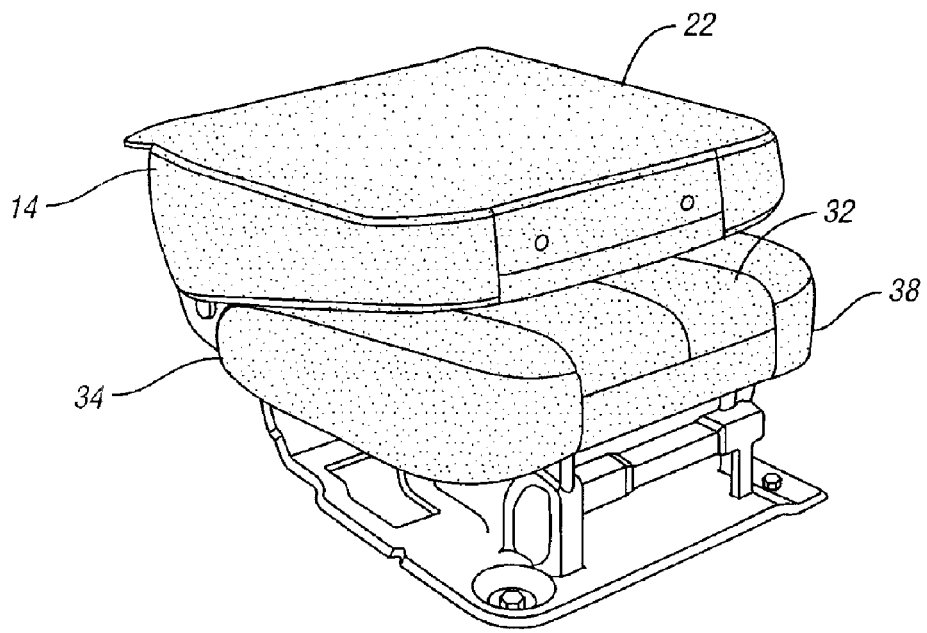
FIG. 2 is a quartering perspective view of the seat assembly in which the seatback lies in a fold flat position.

FIGS. 1–4 respectively depict a remote release actuating system 10 for a seat assembly 12 in a vehicle. The system includes a seatback 14 (FIG. 1) that is moveable through a limited arcuate range about an axis A—A that is positioned toward a lower portion 18 of the seatback 14. The seatback 14 is moveable between a design position (either upright or tilted rearwardly) in which it may support an occupant and a full fold flat position 22 (FIG. 2).

Figure 4:
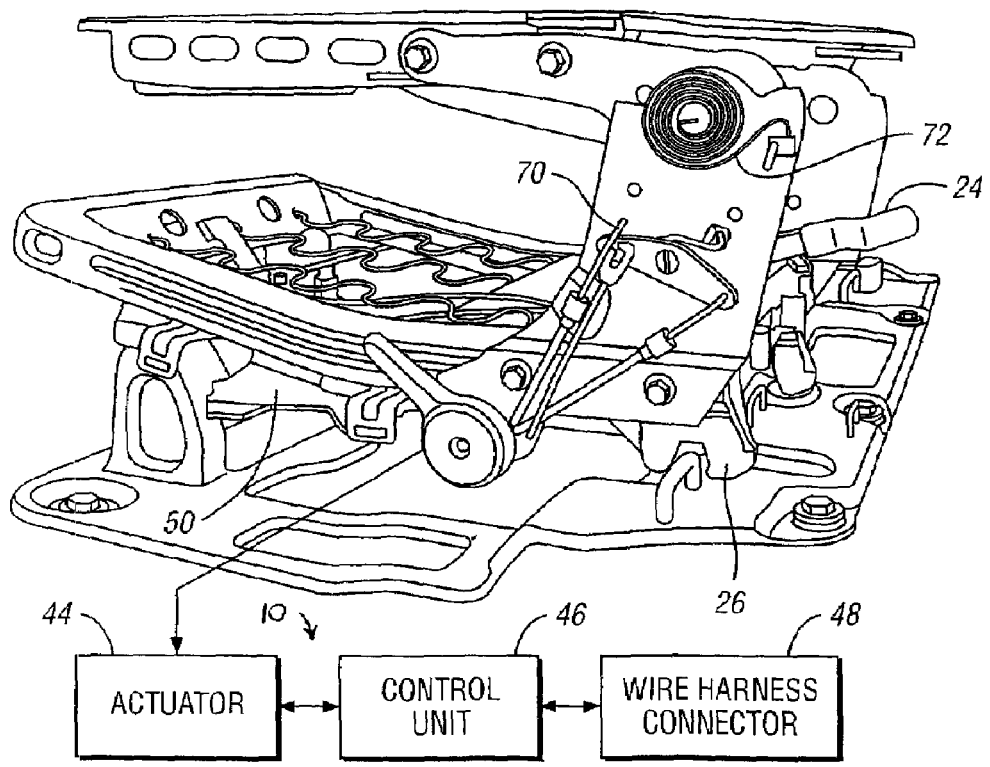
FIG. 4 is a diagram of the remote release activator and quartering side elevation view illustrating a release lever in a full up position, which releases the seat back and floor latches.

As best illustrated in FIG. 4, a pair of seatback latches 24 are operatively connected to the seat assembly for releasably securing the seatback 14 in the effective position. Each seatback latch also performs other functions, to be described later.

A seat cushion 32 supports the seatback 14. The seat cushion 32 has a rearward portion 34 that cooperates with the seatback 14. The seat cushion 32 has associated floor latches 26 (FIG. 4). Each has an open and a closed position. Although depicted as being associated with the seat cushion 32, the floor latches 26 may also be associated with a member that extends from the seatback. The floor latches 26 may extend from the vehicle floor or a tracking system affixed to the floor.

Figure 3:
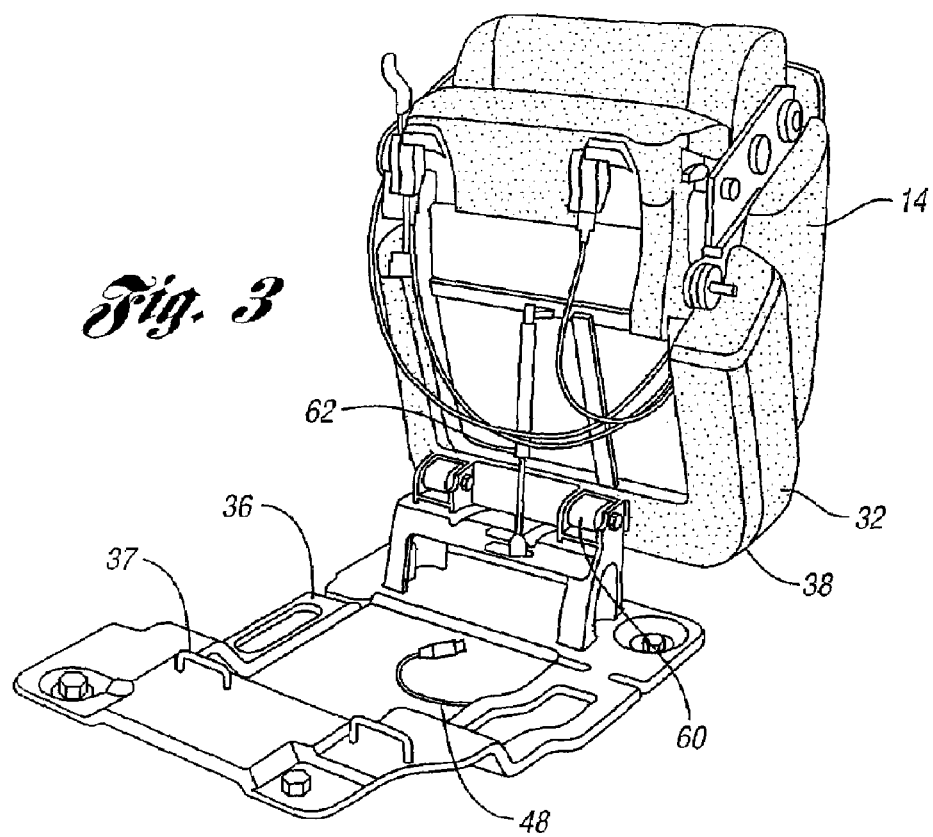
FIG. 3 is a quartering perspective view taken from the rear of the seat assembly, in which the seat cushion and seatback lie in a tumbled position.

When the floor latches 26 engage with floor-mounted stanchions or strikers 37 (FIGS. 3–4), the seat cushion 32 comes rigidly secured to the vehicle floor. The seat cushion 32 has a forward portion 38 that is pivotally attached to the floor about a pivot axis B—B (FIG. 1). When a related control is released under conditions to be described later, the seat cushion 32 and seatback 14 may tumble forwardly (as shown in FIG. 3). For this position to be achieved, the seatback latches 24 are disengaged, the seatback must lie in the full fold flat position, and the floor latches 26 are disengaged. In the tumbled position, occupant ingress and egress are facilitated, as is access to stowage and luggage areas.

Thus, the seat recliner mechanism disclosed incorporates a rotatable seatback which is slaved to the floor latch releases. This prevents the seatback from being rotated from a folded position to a rearward/upward use position unless the floor latches are engaged. One such approach is disclosed in a pending U.S. patent application entitled "Seat Recliner Mechanism Incorporating A Rotatable Seatback Slaved To A Floor Latch Release" that was filed on Aug. 27, 2003 under application Ser. No. 10/649,120, which is incorporated herein by reference.

Located remotely from the seat assembly 12 are systems 44 (FIG. 4) for releasing the seatback latches 34 and floor latches 26. Part of the releasing systems are positioned at an overhead console, a front row headliner, or a C-pillar of the vehicle. The releasing systems are depicted schematically in FIG. 4. Generally stated, the releasing systems include an actuator cable 42 that is linked to an actuator 44 that is in turn in communication with a control circuit or programmable module 46. The control circuit 46 lies in communication with a wire harness connector 48. Although depicted as separate components, the control circuit 46 may be embodied within the actuator 44. Preferably, the actuator 44 is mounted under the seat cushion frame and is preferably mounted to actuator mounting bracket 50.

A suitable system and method for remote release actuation is disclosed in U.S. patent application Ser. No. 10/945,694 which is filed on Sep. 21, 2004, and is incorporated herein by reference.

As illustrated in FIG. 4, the actuator cable 42 connects to the release lever at position 70. When the actuator cable is pulled, it actuates the release lever in exactly the same way as in a manual seat release by the lever 24. Helical spring 72 (FIG. 4) influences the seatback 14 to tilt forwardly when the release lever reaches its intermediate position.

In operation, the remote release actuating system 10 sequentially releases first each seatback latch 24 and then each floor latch 26. When the seatback latches are released, the seatback 14 is allowed to fold flat atop the seat cushion 32. Then, after the floor latches are released, in combination, the seat cushion 32 and folded seatback 14 tumble forwardly together about axis B—B (FIG. 1).

The remote release actuating system 10 of the present invention does not alter or inhibit the manual operation of the system. The remote release system 10 is initially actuated by part of an overall actuation system, such as by pushing a button. The driver's side and passenger's side seats are actuated individually.

The system is disabled unless the vehicle is in Park. Preferably, there is a minimum time duration (for example, 100 milliseconds), over which the actuating button is pressed in order for the system to actuate. Once actuated, the electronic control circuit 46 will keep power applied to the actuator for a time period that is long enough (for example, 5 seconds) to ensure full system release. Past the initial time duration (100 milliseconds, in this example), the system is not dependent on how long the operator presses the button.

In practice, the system 40 for release includes an actuator 44 that is selected from the group consisting of a push button, a toggle switch, and a wireless remote fob. Upon being energized, the actuator 44 then applies a sufficient force and travel to release the seatback latches 24 first (for example, in about 1.6 seconds). This allows the seatback 14 to fall into the forward fold flat position. The actuator continues to apply force and travel to further release the floor latches 26 (for example, within the first 5 seconds).

If the seatback is inhibited from reaching a full fold flat position in a given time period (for example, 1.5 seconds) after seatback latches 24 release, the floor latches 26 will not be released because of a mechanical interlock between the seatback and floor latches. The actuator 44 will return to its home position and the seat will remain in the fold flat position. But if the seatback 14 reaches the full flat position within a period of time (e.g., 1.5 seconds) after seatback latches 24 release, the actuator 44 will also release the floor latches 26 with the button, for example having been pressed only once.

With the seatback 14 in a full fold flat position and the seatback mechanical interlock disengaged, pressing the button, for example, will release the floor latches after a time interval (preferably, about 3.5 seconds). This allows the seatback and seat cushion 14, 32 to tumble forward automatically. As long as the seatback is in an interim position, then the cushion mounted floor latches will not disengage because of the mechanical interlock.

This automatic tumble motion is also present in a manual mode of operation. The motion occurs under the influence of torsion springs 60 at the seat tumble pivots along the axis B—B (FIG. 1) and a gas strut 62. Together, the torsion springs 60 and gas strut 62 co-operate to modulate and dampen the seat tumble movement.

The remote release actuating system 10 requires a multiple wire (e.g., 4-wire, 5-amp connection) to the seat wiring harness 48: a hot wire, ground, switch leg, and an unused fourth pin position.

It will be appreciated that the disclosed invention is well-suited for deployment in the second or third row of a vehicle seat.

It will be also appreciated that once the electric motor is actuated, it influences a gear train which pulls the actuator cable, which in turn exerts a force over a distance. If the actual distance traveled is less than a desired distance, the force is removed. It will also be appreciated that the examples of time, amperage, voltages, and forces included in this description should be construed as illustrative only, and not be limiting.

In FIG. 4, the floor latches are released and the release handle is depicted in the full up position. In such a configuration, the interlock is disengaged. For the interlock to be engaged (not shown), the floor latches are still locked and the release handle is in the half up position.

Figure 5A:
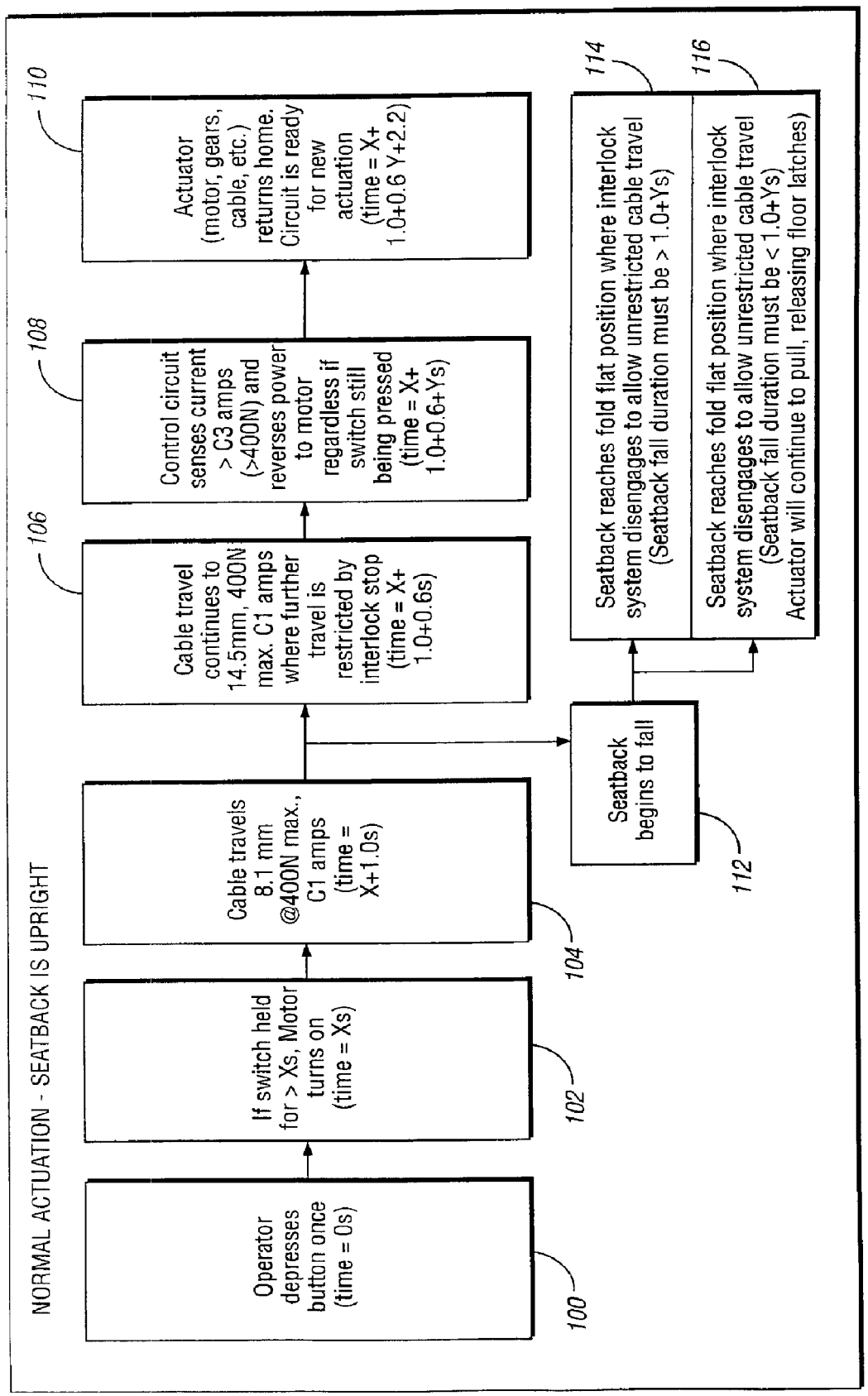
FIG. 5(a)—normal actuation: seatback upright.

In FIG. 5(*a*), there is a process flow diagram that illustrates normal actuation beginning when the seatback is upright. At a zero time reference (0) an operator depresses an actuation button once (box 100). If the button is depressed for more than a given interval (X) an electric current is energized (box 102). A circuit controlled motor causes an associated cable to travel for a given distance (e.g., 8.1 millimeters) and exerts a given force (e.g., at a maximum of 400 Newtons). To accomplish this, current is delivered to the motor in the amount of about 1 amp at 12 volts (box 104). At this point in the sequence of operations, time=X plus 1.0 seconds (for example). The seatback then begins to fall (box 112) if there are no impediments.

In box 106, cable travel continues to a given point (for example, 14.5 millimeters), again exerting a force up to about 400 Newtons. Further travel is restricted by an interlock stop. Upon completion of this step, the time elapsed is about X+1.0+0.6 seconds, for example.

In box 108, if the control circuit senses a current exceeding a programmed amperage draw (about 2.5–3.5 amps) and/or a stopped movement of cable travel, the circuit reverses power to the motor regardless of whether the button is still being pressed. (Time=X+1.0+0.6+Y.) Thereafter (box 110), the actuator (including the motor, gears, and cable)

returns home: the circuit is ready for a new actuation. (Time=X+1.0+0.6+Y+2.2, for example.)

After the seatback begins to fall (box 112) the seatback may reach the fold flat position (box 114). In this position, the interlock system disengages to allow unrestricted cable travel. Preferably, the seatback fall duration must exceed about 1.0+Y seconds. If the seatback fall duration is less than this interval, the actuator will continue to pull, releasing the floor latches.

Figure 5B:
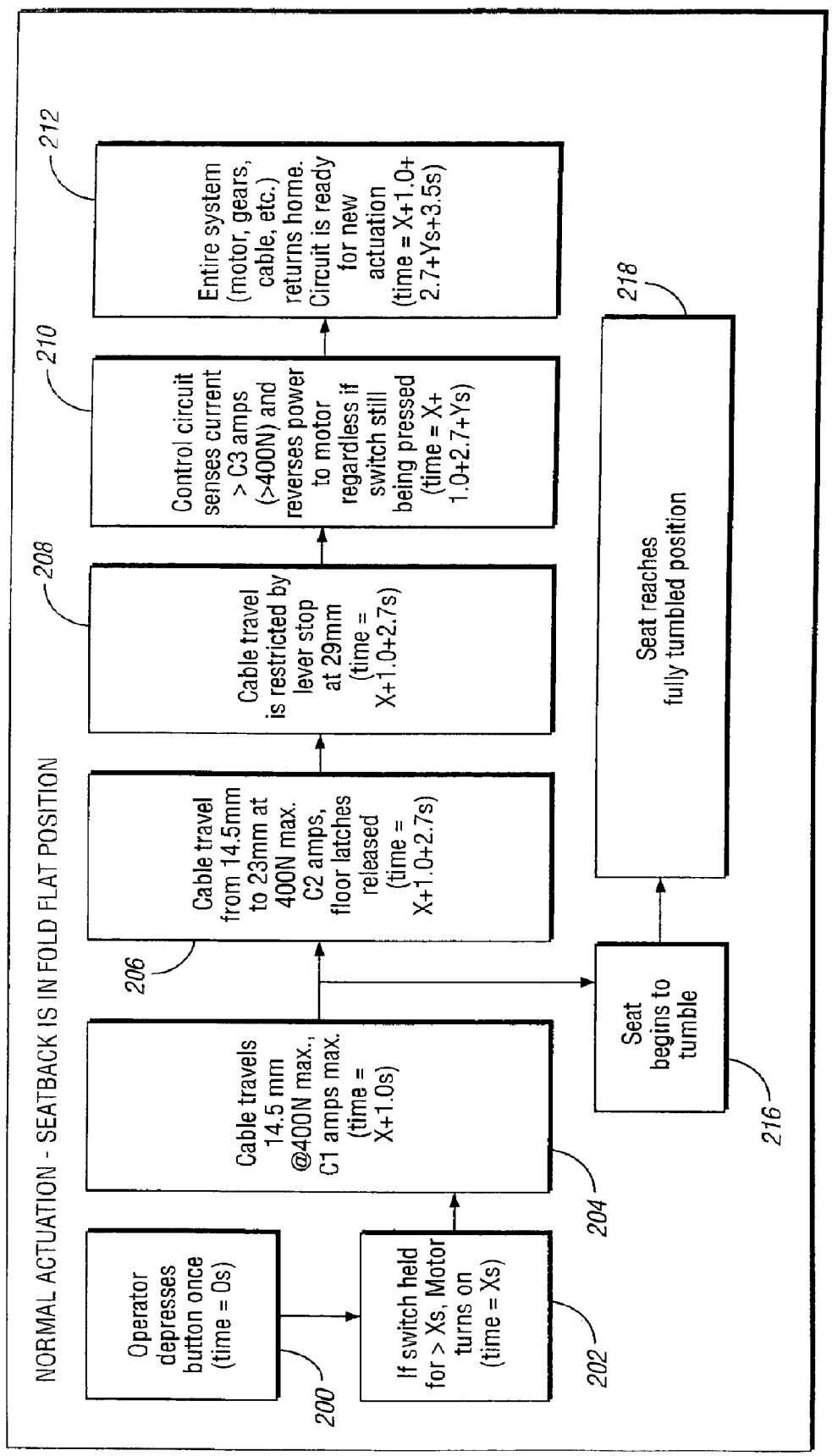
FIG. 5(b)—normal actuation: seatback in fold flat position.

The normal activation sequence with the seatback in the fold flat position (FIG. 5(b)) will now be described. The first three steps (boxes 200, 202 and 204) resemble those described in reference to boxes 100, 102 & 104. Box 206 resembles box 106 except that cable travel occurs from about 14.5 millimeters in a preferred embodiment to about 23 millimeters. In box 206, the amperage represented by the variable $C_2$ is estimated to be about 2.0 amps at 12 volts. At that point, the floor latches are released. (Time=X+1.0+2.7 seconds, for example.) In box 208, cable travel is restricted by a lever stop at a given displacement (e.g., 29 millimeters). At that point, time=X+1.0+2.7 seconds, for example. The control circuit then senses (box 210) a current greater than $C_3$ amps (e.g., >2.5–3 amps at 12 volts) and/or a stopped movement of cable travel and reverses power to the motor regardless of whether the button is still being pressed. (Time=X+1.0+2.7+Y, for example.) In box 212, the entire system (motor, gears, cable, etc.) returns home. The circuit is now ready for a new actuation. (Time=X+1.0+2.7+Y seconds+3.5 seconds, for example.) After the seat begins to tumble (box 214), the seat ultimately reaches the fully tumbled position (box 216).

Figure 5C:
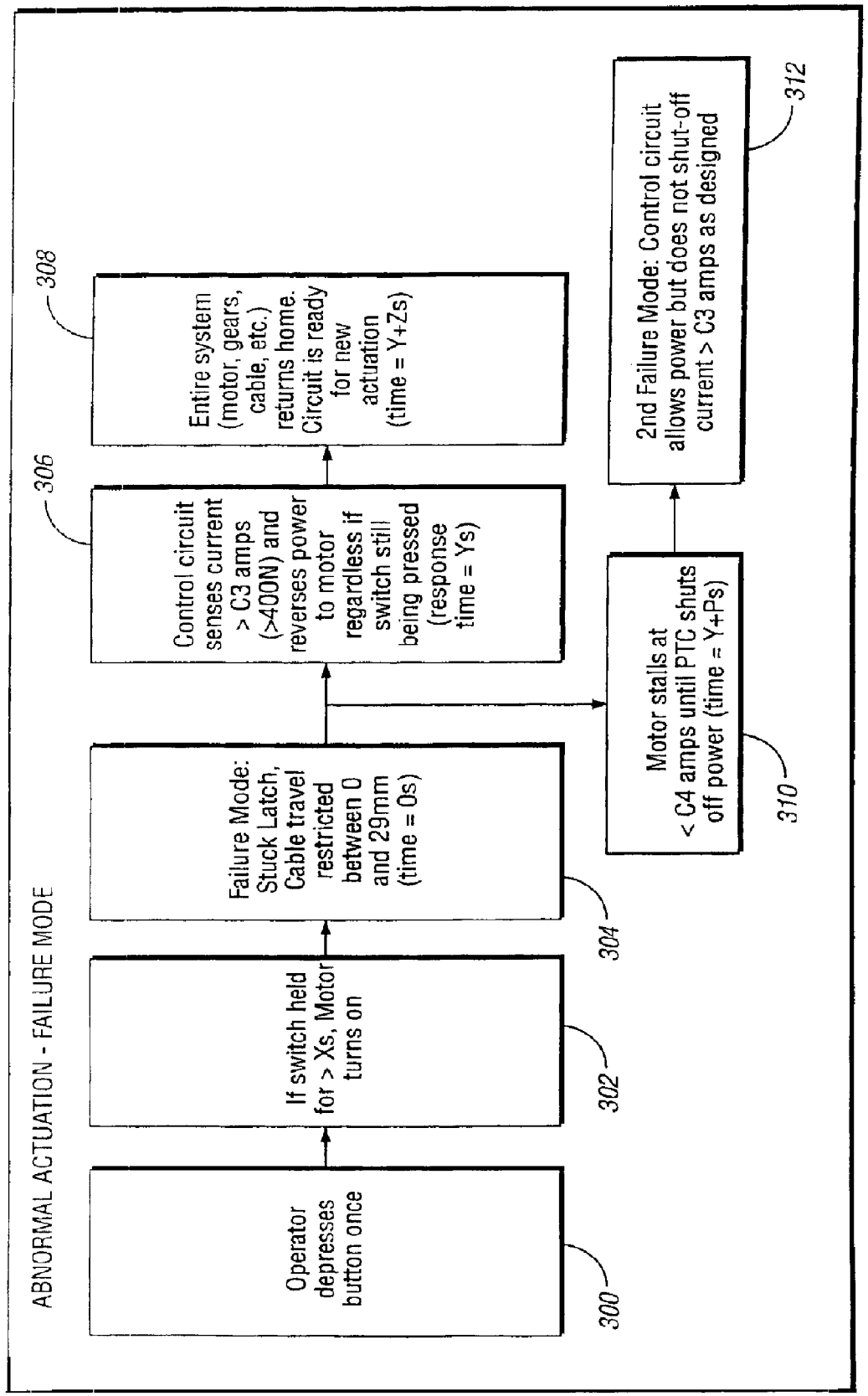
FIG. 5(c)—abnormal operation failure modes.

Abnormal operation and failure mode are described in FIG. 5(c). Suppose the operator depresses the button once (box 300). If the button is held for more than a given interval (e.g., a programmable time of X seconds), the motor will turn on (box 302). Box 304 suggests that a failure mode may be encountered: for example, one or both of the latches may be stuck. In such instances, cable travel is restricted between a minimum and a maximum displacement (e.g., between 0 and 29 millimeters). Time=0 seconds.) In box 306, the control circuit senses that the current is greater than $C_3$ amps, which is the programmed amperage draw (estimated to be preferably about 2.5–3.5 amps). This amperage exceeds $C_2$, to allow for voltage, temperature and other performance variations. A current exceeding about 3 amps and/or a stopped cable travel movement suggests a force greater than 400 Newtons, whereupon power to the motor is reversed regardless of whether the switch is still being depressed (Response time=Y seconds). In box 308, the entire system (motor, gears, cable, etc.) returns home. The circuit is ready for a new actuation (time=Y plus Z seconds).

In a second failure mode (box 310) the control circuit allows power but does not shut off current. The motor stalls at an amperage which would be about 4.4 amps at 14.5 volts and 25° C.

In the operations thus far described, there has been contemplated a remotely located actuating system to facilitate the folding and tumbling feature of the seat assembly. If a power return feature is absent, reversion from the tumbled forward position will be effectuated manually.

Thus, the activation of the button 40 for releasing effectively closes an electrical circuit 46. An electrical signal then initiates a sequence within the control module 44 that keeps power supplied to an electric motor (not shown).

As used herein, an actuator includes a motor and a gear assembly. A suitable motor is available from Schukra Lumbar Systems, located in Ontario, Canada (Part No. 8011704B). A suitable gear case assembly is also available from Schukra (Part No. asm 5030002). A suitable remote actuating means is available from Borg Warner under the Part No. BIO0326. A suitable program module is available from Schukra While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for a vehicle, the assembly including:
   a seat back that is moveable through an arcuate range about an axis, the seat back being moveable between a design position in which it may support an occupant and a full fold flat position;
   one or more seat back latches that are operatively connected to the seat assembly for releasably securing the seat back in the design position;
   a seat cushion that supports the seat back, the seat cushion having a rearward portion that cooperates with the seat back, the seat cushion having one or more associated floor latches located proximate a rear portion of the seat, the seat cushion having a forward portion that is pivotally attached to the floor so that the seat cushion and seat back may tumble forwardly when the seat back latches are disengaged, the seat back lies in the full fold flat position and the floor latches are disengaged to facilitate occupant ingress and egress in relation to the vehicle; and
   a release system associated with the one or more seat back and floor latches for releasing the one or more seat back and floor latches, the release system including one or more activators for closing an electrical circuit, at least some of the one or more activators being selected from the group consisting of a button, a toggle switch and a wireless remote key fob, the one or more activators being positioned at a location selected from the group consisting of an overhead console, a front row headliner, and a C-pillar of the vehicle.

2. The seat assembly of claim 1, wherein the at least part of the release system includes an actuator mounted under the seat cushion and an electronic control circuit in communication with the actuator and the latches, the circuit delivering electrical power to the actuator for a time period that is long enough to ensure release of the latches.

3. The seat assembly of claim 2, wherein the actuator applies a force and travel sufficient to release the seat back latches to allow the seat back to fall into the forward fold flat position.

4. The seat assembly of claim 3, wherein the actuator includes means for applying a force and a travel to release the one or more floor latches after the seat back latches are released.

5. A seat assembly for a vehicle, the assembly including:
   a seat back that is moveable through an arcuate range about an axis, the seat back being moveable between a design position in which it may support an occupant and a full fold flat position;
   one or more seat back latches that are operatively connected to the seat assembly for releasably securing the seat back in the design position;
   a seat cushion that supports the seat back, the seat cushion having a rearward portion that cooperates with the seat back, the seat cushion having one or more associated floor latches located proximate a rear portion of the seat, the seat cushion having a forward portion that is pivotally attached to the floor so that the seat cushion and seat back may tumble forwardly when the seat back latches are disengaged, the seat back lies in the full fold flat position and the floor latches are disengaged to facilitate occupant ingress and egress in relation to the vehicle; and a release system associated with the one or more seat back and floor latches for releasing the one or more seat back and floor latches, the one or more activators being positioned at a location selected from the group consisting of an overhead console, a front row headliner, and a C-pillar of the vehicle, wherein the seat assembly includes means for retaining the one or more floor latches in a closed position if the seat back is inhibited from reaching the full fold flat position within a first time interval after release of the one or more seat back latches.

6. The seat assembly of claim 5, wherein the means for retaining the one or more floor latches in the closed position comprises a mechanical interlock between the one or more seat back and floor latches.

7. The seat assembly of claim 5, wherein the first time interval is about 1.5 seconds.

8. The seat assembly of claim 5, further including means for tumbling the seat cushion forwardly within a second time interval after the seat back reaches the full fold flat position, the mechanical interlock being disengaged and the electronic control circuit being closed.

9. The seat assembly of claim 6, wherein the seat back mechanical interlock is disengaged following orientation of the seat back in the full forward flat position, the one or more floor latches becoming released in about 3.5 seconds following engagement of the actuator, the seat cushion and the seat back then tumbling forwardly without manual assistance.

10. The seat assembly of claim 8 wherein the automatic tumble mode occurs under the influence of one or more torsion springs located at seat tumble pivots and a gas strut that controls and dampens seat tumble movement.

11. The seat assembly of claim 8 wherein the means for tumbling comprises a torsion spring located proximate the forward portion of the seat cushion and the floor of the vehicle.

12. The seat assembly of claim 9, further including means for controlling and dampening seat tumble movement.

13. The seat assembly of claim 12, wherein the means for controlling and dampening seat tumble movement comprises a gas strut.

14. A method for remotely releasing a seat assembly in a vehicle so that the seat assembly may have a seat back that pivots toward a full fold flat position in relation to a seat cushion and the seat cushion and seat back may in combination tumble forwardly about a forward portion of the seat cushion, the method comprising steps of:

providing one or more seat back latches that are operatively connected to a seat assembly for releasably securing the seat back in a design position;

positioning a seat cushion to support the seat back and providing the seat cushion with one or more associated floor latches for engaging the floor of the vehicle;

actuating a release system by depressing an activator for closing an electrical circuit, activator being selected from the group consisting of a button, a toggle switch, a wireless remote key fob, the release system being associated with the one or more seat back and floor latches, the activator being at a location selected from the group consisting of an overhead console, a front row headliner, and a C-pillar of the vehicle so that upon actuating the releasing system, the seat back falls forwardly and the seat cushion and seat back in combination tumble forwardly, thereby facilitating occupant ingress and egress while providing improved access to luggage and stowage spaces.

15. The method of claim 14, wherein the actuating step requires depressing the activator for more than a pre-programmed interval of time.

16. The method of claim 14 wherein the actuating step comprises depressing the activator for more than 100 milliseconds.

17. The method of claim 15, wherein the activating step is disabled unless the vehicle's transmission system is in "park".

18. The seat assembly of claim 1, wherein the release system includes a cable that extends between an actuator mounted under the seat cushion and a release lever associated with a seatback latch, the cable being in operative communication with the seatback latch during deployment of the release system.

19. The seat assembly of claim 2, wherein the seatback and floor latches can be operated manually, even if the electronic control circuit is deprived of electrical power.

* * * * *